United States Patent
Jacquet et al.

[11] Patent Number: 5,322,540
[45] Date of Patent: Jun. 21, 1994

[54] METHOD OF DEPOSITING PYROLYZED FILMS HAVING IMPROVED PERFORMANCE AND GLAZING PANE COATED WITH THE SAME

[75] Inventors: Patrice Jacquet, Vieux Moulin, France; Vincent Sauvinet, Copenhague, Denmark

[73] Assignee: Saint-Gobain Vitrage International, Courbevoie, France

[21] Appl. No.: 862,437

[22] Filed: Apr. 2, 1992

[30] Foreign Application Priority Data

Apr. 9, 1991 [FR] France .................. 91 04286

[51] Int. Cl.[5] .................. C03C 17/23; C03C 17/36
[52] U.S. Cl. .................. 65/60.2; 65/60.5; 65/60.8
[58] Field of Search .................. 65/60.1, 60.2, 60.4, 65/60.5, 60.51, 60.7, 60.8, 60.52; 428/432

[56] References Cited

U.S. PATENT DOCUMENTS

| | | | |
|---|---|---|---|
| 3,762,902 | 10/1973 | Wagner et al. | 65/60.2 |
| 4,022,601 | 5/1977 | Sopko | 65/60 |
| 4,187,336 | 2/1980 | Gordon | 428/34 |
| 4,414,015 | 11/1983 | Van Laethem et al. | 65/60.5 |
| 4,828,880 | 5/1989 | Jenkins et al. | 65/60.8 |
| 4,859,499 | 8/1989 | Sauvinet et al. | 65/60.52 |
| 4,952,423 | 8/1990 | Hirata et al. | 427/109 |
| 5,102,691 | 4/1992 | Russo et al. | 65/60.5 |

FOREIGN PATENT DOCUMENTS

| | | |
|---|---|---|
| 170216 | 2/1986 | European Pat. Off. . |
| 2041843 | 3/1971 | Fed. Rep. of Germany . |
| 2005224 | 12/1969 | France . |
| 1266452 | 3/1972 | United Kingdom . |
| 2078710 | 1/1982 | United Kingdom . |
| 2199848 | 7/1988 | United Kingdom . |

*Primary Examiner*—W. Gary Jones
*Assistant Examiner*—Steven P. Griffin
*Attorney, Agent, or Firm*—Oblon, Spivak, McClelland, Maier & Neustadt

[57] ABSTRACT

A method of depositing a coating on a glass substrate by pyrolysis, which entails:

superheating a face of a substrate intended for receiving a coating to a temperature higher than or equal to the softening temperature of the substrate, and depositing the coating without any homogenization of the temperature throughout the substrate to a value going above the softening temperature of said substrate being produced within the thickness of the substrate.

15 Claims, 1 Drawing Sheet

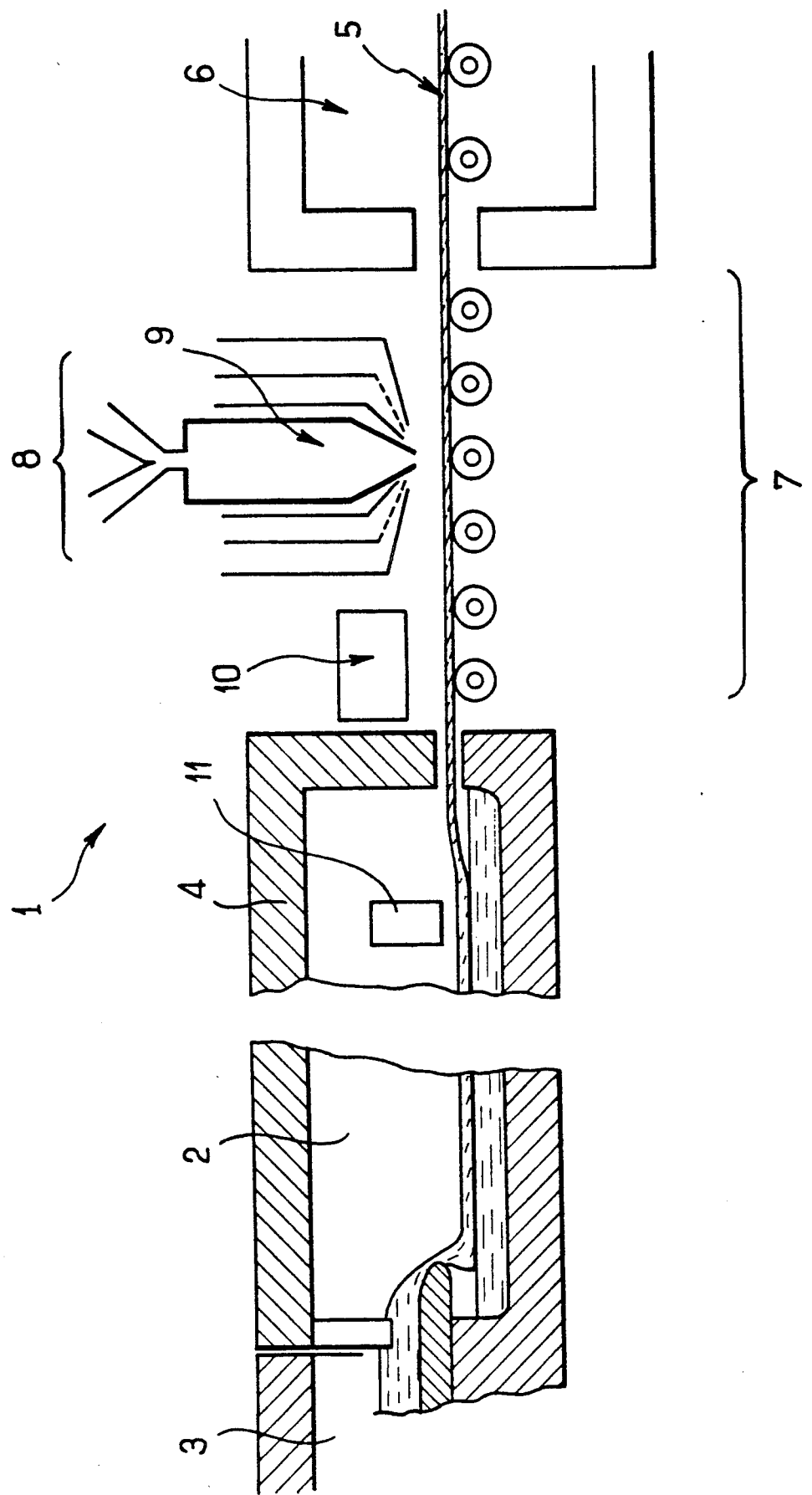

METHOD OF DEPOSITING PYROLYZED FILMS HAVING IMPROVED PERFORMANCE AND GLAZING PANE COATED WITH THE SAME

BACKGROUND OF THE INVENTION

1. Field of the Invention

The present invention relates to a method of depositing pyrolyzed films having improved performance and a glazing pane coated with the same.

2. Description of the Background

It is known, from EP 125 153, for example, that a low-emissivity film can be formed on a glass substrate from a tin compound in powder form, especially from dibutyl tin fluoride (DBTF). The deposition is carried out at a high temperature in the region of 550° C. This deposition may be performed at a speed sufficiently high for coating a ribbon of float glass, of whatever thickness, that is to say at a speed which may range from 3 to more than 25 m/min and which on average, for glass thicknesses most commonly produced at present, is about 12 m/min.

When a film of $SnO_2$, doped with fluorine, of a thickness of about 180 nm is produced as described in EP 125 153, an emissivity of the order of 0.35 is achieved. With an increased thickness of from 300 to 350 nm, an emissivity of the order of 0.25 is attained.

This 180 nm film is slightly bluish in reflection, and can tolerate only small variations in thickness, of the order of the size of the DBTF molecule, if variations in color are to be avoided. Thus, if the thickness increases too much, the color becomes yellow.

The film of 300 to 350 nm thickness is slightly green in reflection and if its thickness varies too much, its color also varies. Thus, if its thickness increases, the color of the film may become red.

Therefore, film thickness must be carefully controlled so that the color of the film will not vary locally if the thickness is not uniform, or overall if the thickness remains uniform. Moreover, the selection of desirable performance characteristics for a product cannot be made without considering that performance and thickness, and therefore color, are linked together. It is possible to remove these constraints, imposed by color, by selecting film thickness ranges for which the colored appearance in reflection disappears. Certainly, interesting emissivity levels are achieved, of the order of 0.12 and even less, from 800 or 1,000 nm. However, the light transmission through the glazing is reduced, production costs are increased by the much greater consumption of coating material, and the dull, veiled appearance of the film, approximately proportional to its thickness, increases. Further, production difficulties increase (for example, fouling of the powder projection nozzle increases due to the higher powder flow rates), and, hence, cleaning and stoppages become more frequent. Further, the glass is much more cooled, and, hence, pyrolysis is less effective. Additionally, process limits are also approached, and greater amounts of pollutants are produced.

It is also known that the pyrolysis efficiency can be increased if the deposition is carried out on a hotter glass, but this leads to defects of planeity in the glass by reason of its increasing deformability with temperature. In fact, if the glass were raised to too high a temperature, it would soften and sag between the supporting rollers conveying it.

Thus, a need exists for a method of depositing pyrolyzed films having improved performance and a glazing pane coated with the same.

SUMMARY OF THE INVENTION

Accordingly, it is an object of the present invention to provide a method of depositing pyrolyzed films having improved performance characteristics.

It is also an object of the present invention to provide a glazing pane coated with the same.

The above objects and others are provided by a method of depositing a coating on a glass substrate by pyrolysis, which comprises:

a) superheating a face of the substrate intended to receive the coating to a temperature of higher than or equal to the softening temperature of the substrate, and then b) depositing the coating without any homogenization of temperature throughout the thickness of the substrate, whereby within the thickness of the substrate a temperature is reached in excess of the softening temperature of the substrate.

BRIEF DESCRIPTION OF THE DRAWINGS

The figure illustrates a production line for flat glass, including a float installation, in accordance with the present invention.

DETAILED DESCRIPTION OF THE PREFERRED EMBODIMENTS

In accordance with the present invention, it has been discovered that the performance of films deposited by pyrolysis can be increased without increasing costs, without increasing the amount of pollutants produced, without creating a veiled appearance, without approaching process limits and without altering the planeity of the substrate. The present invention also eliminates color constraints, while the improved performance of the deposited film affords greater choice in film thickness.

In general, the present invention relates to the deposition of pyrolyzed films on a glass substrate, especially of interference films, notably based upon $SnO_2$, and indium doped with tin (ITO), for example. The present invention is especially well adapted to the deposition of pyrolyzed films obtained from pulverulent compounds.

In accordance with the present invention, a pyrolyzable compound is distributed onto a substrate of hot glass, previously superheated rapidly and on one side only, at the side intended for receiving the pyrolyzable compound, and sufficiently rapidly for the temperature not to become equalized or homogenized throughout the thickness of the glass.

The present invention entails, therefore, superheating a face of a substrate to a temperature greater than or equal to the softening temperature of the substrate, which may notably reach 690° C., and then effecting the deposition by pyrolysis without this rise of temperature being able to propagate through the glass thickness of the substrate, and causing a homogenization of temperature in the thickness of the glass to a temperature higher than its softening temperature. Generally, it may be stated that the softening temperature of the glass is about 650° C.

Taking into account a certain inevitable cooling of the glass between the superheating zone and the effective pyrolysis deposition zone, it is thus possible to carry out the pyrolysis on one face of a glass substrate which maintains a substantial rise in temperature, notably a rise which may be as high as 60° C. By comparison, the usual pyrolysis temperatures already referred to, which are of the order of 580° C., are encountered when these techniques are used on a glass ribbon leaving a float bath, for example.

By carrying out the deposition at such a high temperature, the pyrolysis efficiency is improved, without however, affecting the optical quality of the glass. In fact, there is insufficient time for the glass to reach softening temperature in the core. Consequently, there is no risk of sagging if the glass is carried on conveying rollers.

The present method also makes it possible to achieve high performance characteristics for the pyrolyzed film, such as emissivity, which are better than those that can normally be attained by deposition of the film at a homogeneous temperature of the glass substrate which does not affect its planeity.

These deposition conditions enable high performance characteristics to be achieved, making it possible to attain films of reduced thickness as compared with the thicknesses commonly employed, and in the usual conditions of temperature.

This reduction in thickness is accompanied by the maintenance of a colored appearance of the films obtained and, in order to attenuate or eliminate this colored appearance, the present invention also provides an anti-color treatment.

According to another aspect of the present invention the anti-color treatment is an underlying film having appropriate index and thickness characteristics.

Among the anti-color treatments provided by the present invention, which may be mentioned are an anti-color underlying film deposited by CVD (Chemical Vapour Deposition) upstream of the pyrolyzed film having properties, notably, of low emissivity, which are, in particular, carried out inside the float bath of the glass manufacturing line.

The anti-color underlying film may also be obtained by other pyrolysis processes, such as pyrolysis of organometallic compounds in solution or in suspension in a liquid, pyrolysis of compounds in the pulverulent state, or CVD outside the float bath, for example.

The term "underlying film" should be understood to include a single homogeneous thickness, a double thickness, a thickness having an index gradient and, generally, any underlying single or multiple deposition known to the artisan in this field.

Among the anti-color treatments, mention may also be made of overlying films, that is single or multiple depositions or those having evolutive characteristics (index gradients) deposited over the functional film, notably of low emissivity, of which it is desired to attenuate or eliminate the colored appearance in reflection, and also the combinations of underlying and overlying films.

The present invention will now be described in more detail with the figure reference to the figure. The figure shows the diagrammatic layout of a production line for glass having films according to the present invention, using the float process and producing the films by pyrolysis at exit from the float unit for the one film, and by CVD pyrolysis inside the float unit, for the other film.

FIG. 1 shows a production line 1 for flat glass, including a float installation 2.

Glass melted in a melting furnace 3 is fed into the float installation 2, where it spreads out, acquires the characteristics of planeity, polish, width and thickness desired, by floating on a molten tin bath enclosed in an enclosure 4, in which a reducing atmosphere is maintained. A continuous ribbon 5 of glass is thus formed in the float unit 2. This ribbon 5 is discharged from the float unit 2 and travels, in the free atmosphere, a certain distance which can vary from one production line to another, before entering an annealing furnace 6. In this free atmospheric zone 7, after the float unit 2 and before the annealing furnace 6, there are situated coating means 8 for coating the glass band 5 by a pyrolysis process. The pyrolysis process may be a powder pyrolysis process, which entails distributing as uniformly as possible onto the hot glass leaving the float unit 2, by means of a nozzle 9 of the type of those described in EP 125 153 described above, this nozzle extending opposite the glass band across its entire width, a powder or mixture of powders in suspension in a carrier gas, generally air. The powder or powders decompose on contact with the hot glass and oxidize, to leave on the glass a thin metallic oxide film.

This pyrolysis process may also be a liquid pyrolysis process, in which the reactive and heat-decomposable metallic compounds are in solution or suspension in a liquid. This process is, for example described in FR 2 176 760.

A CVD process may also be used in which the reactive compounds are in the gaseous state. It should be noted that CVD pyrolysis may even be carried out inside the float enclosure, in its last portion before the glass leaves, by means of a nozzle 11.

The powder pyrolysis process has, in particular, the advantage of not using solvents, and therefore of causing less pollution, less toxicity, and less cooling of the glass. It also permits high speeds of passage for the glass, i.e., all those speeds used for the production of usual float glasses, that is of 1.5 to 2 mm thickness, of up to 8, 10, 12 mm and beyond—and provides films which are particularly resistant.

According to the present invention, in order to achieve high performance levels of the electrically conducting, low-emissivity pyrolyzed film, the surface of the glass intended for receiving said film is, immediately before the deposition, rapidly superheated with a high intensity of heating by uniform and intense heating means 10. These heating means should be capable of rapidly heating the exposed face of the glass ribbon in a homogeneous manner. It is thus preferred to use heating systems which produce heat by combining, with a radiation phenomenon due to the presence of an incandescent surface, obtained by flame-less combustion of hot gas, a convection phenomenon of discharged hot gases resulting from the combustion. Without risk of a flame touching the glass in an irregular manner, the heating is more uniform and more controllable.

Where it is the upper surface of the glass band which receives the film deposit, it is this upper surface which receives the maximum of heat and the intensive heating means are disposed above the glass ribbon, along its entire width, and are directed in such a way as to heat its upper face.

In the case of a deposition on the other face of the glass ribbon, the intense heating means are, of course, arranged differently.

These complementary intensive heating means are positioned and dimensioned in such a way as to produce a higher temperature at the surface of the glass intended for receiving the thin film by pyrolysis, without the thickness and opposite surface of the glass undergoing a substantial increase in their temperature, which would prejudice the good planeity of the glass band which, at this excessively high temperature, would run the risk of deforming on the conveying means which supply the annealing furnace 6.

For this purpose on the one hand, but also for reasons of space between the pyrolysis zone and the exit from the float unit, on the other hand, the intensive heating means are of short length in the direction of travel of the glass ribbon.

In fact, a long heating length and therefore a long heating time would lead to a considerable diffusion of the supplementary heat into the thickness of the glass, and would therefore result in the drawback pointed out. Thus, intensive heating lengths of the order of 1 m or less, preferably of the order of 50 to 60 cm, for speeds of passage of the glass of the order of 6 to 20 m/min and therefore around 10 m/min, are recommended, which corresponds to heating times of the order of a few seconds, from about 2 to around 10 seconds.

This heating is, for example, produced by a gas heating means, notably using acetylene, propane, or butane, for example.

The superheating time and power will be adjusted in such a way as to obtain a rise in temperature of the glass face to be coated up to about 30° to 60° C. at the pyrolysis time and, on average, of the order of 40° to 50° C. With such temperature rises of the glass face to be coated, the other face of the glass does not heat up, or not by more than about 20° C., before pyrolysis and, preferably, by not more than about 10° C. to 15° C., so that no notable deformation is recorded.

Thus, for example, the face of the substrate intended to receive the coating is superheated so that it has, during deposition by pyrolysis, a temperature of about 630° C.

In view of the natural cooling of the glass, which takes place from exit from the float unit to the pyrolysis location, it has been found necessary to provide a greater rise of temperature to the glass by superheating, a rise which brings the surface of the glass which will later be coated to approximately 80° C. above the temperature of the glass at exit from the float unit. After the thus superheated glass has travelled as far as beneath the pyrolysis nozzle, in spite of the natural cooling, the effect of the superheat of 30° C. to 60° C. and, on average, of 40° C. to 50° C., remains substantial and enables an increase of the order of 20 to 25% of the pyrolysis efficiency to be achieved. A distance between the superheating zone, where the heating elements are situated, and the deposition zone, where the nozzle is situated, of the order of a meter or even a smaller distance is recommended, which enables the cooling phenomenon to be reduced.

Furthermore, while one of the glass faces, in general the upper face, is superheated, in order to reduce the influence upon the other face, a slight cooling of this other face may be carried out. By means of such a superheating of the order of 40° to 50° C., carried out on a glass ribbon intended to be coated with a thin, low-emissivity film of tin oxide doped with fluorine, for example from a DBTF (dibutyl tin fluoride) powder, emissivity performances are obtained which would be those of films of the same nature, produced without superheating, but of thicknesses greater by 70 to 150 nm. Thus a tin oxide film doped with fluorine, produced after superheating, may have a resistivity of the order of $5 \times 10^{-4}$ $\Omega$.cm, whereas in the absence of superheating the resistivity would be of the order of $10 \times 10^{-4}$ $\Omega$.cm.

The comparative table below summarizes these surprising improvements in performance, using a film of $SnO_2$ doped with fluorine as an example.

TABLE

| Thickness | Without superheat Emissivity | With superheat Emissivity | Color in reflection |
| --- | --- | --- | --- |
| 340 nm | 0.23 | 0.17 | green |
| 500 nm | 0.21 | 0.14 | green-blue |
| 170 nm | 0.35 | 0.30 | blue |
| 225 nm | 0.30 | 0.25 | yellow |

Thus, for equivalent performance, superheating makes possible a reduction in the film thickness while maintaining film performance.

The variations in thickness, however, are accompanied by changes in color, and there is a risk that the new colors will not be pleasing and/or will not be suitable for the application envisaged. In order to avoid any constraint linked to the color, an anti-color treatment is carried out.

This treatment entails the use of one or more underlying films of suitable thicknesses and indices, as described for example in FR 2 439 167, one or more overlying films of suitable thicknesses and indices, or a combination of underlying film or films and overlying film or films.

According to one preferred form of the invention, the glass substrate is characterized by the fact that the anti-color function is achieved by at least one underlying film of thickness $\lambda/4$ optimized for a wavelength of the order of 550 nm, of index $$n = \sqrt{n_{glass} \times n_{film}}$$

deposited between the glass substrate and the thin conducting film.

A simple way of producing an underlying film, requiring no cooling of the glass and no additional space, is to deposit the underlying film by CVD inside the float unit. This CVD technique inside the float unit is described, notably, in FR 2 274 572, FR 2 382 511 and FR 2 314 152, for example. This technique is used, notably for the production of an anti-color SiO-Si film.

With advantage, the nozzle for CVD enabling this underlying film to be deposited is of the type of those described in Applications FR 91/01683 and FR 91/01682.

The anti-color film deposited by CVD should have a thickness of the order of 70 to 80 nm and an index of between 1.45 and 2, preferably between 1.60 and 1.80 and, more specifically, for an optimum effect between 1.68 and 1.72.

The gaseous composition used for obtaining this film generally contains a silane in association with an unsaturated carbide such as ethylene and, possibly also, an oxidant such as carbon dioxide or another gas, as taught by EP 275 662 and EP 348 185, for example.

Other techniques for the production of the underlying film may also be usual, such as, for example, the liquid pyrolysis technique, as described in FR 90/08530 and FR 90/08531, in which the underlying film is respectively based upon $Al_2O_3/TiO_2$ and $Al_2O_3/SnO_2$.

An underlying film formed by solid pyrolysis, as taught by FR 90/15277, may also be used.

An overlying film produced by solid, liquid or gas pyrolysis is also possible, even directly on the float production line for the glass. Thus, for example, an overlying film of $Al_2O_3$ having a thickness of the order of 80 to 100 nm and an index from 1.4 to 1.7 may be used as described in Application FR 91/02002, for example.

An anti-color function is, therefore, of considerable advantage, associated with a superheating before pyrolysis of the low-emissivity, conducting film. It enables the color constraints to be overcome and makes it possible to benefit fully from the additional freedoms from the point of view of thickness, which superheating makes possible.

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. A method of depositing a coating on a glass substrate by pyrolysis, which comprises:
   a) superheating a face of the substrate intended to receive the coating to a temperature equal to or greater than a softening temperature of the substrate, such that said substrate face has, during said deposition, an increase in temperature of about 30° C. to 60° C. relative to a pyrolysis temperature of about 580° C.; and
   b) depositing the coating on the substrate without homogenization of temperature through the substrate, whereby within a thickness of the substrate a temperature is reached in excess of the softening temperature of the substrate, and
   wherein a rise in temperature of a face of said substrate opposite to said face to be coated is not more than about 20° C., relative to a pyrolysis temperature of about 580° C., before pyrolysis.

2. The method of claim 1, wherein the glass substrate is a moving glass ribbon leaving a float glass production enclosure.

3. The method of claim 1, wherein said superheating comprises heating the substrate face to be coated to about 690° C.

4. The method of claim 1, wherein the face of the substrate intended to receive the coating is superheated so that has, said substrate face during deposition, a temperature of about 630° C.

5. The method of claim 1, wherein the opposite face of the glass substrate is simultaneously cooled.

6. The method of claim 1, wherein the superheating is carried out over a distance which is at most about 1 m.

7. The method according to claim 6, wherein the superheating is carried out over a distance of about 50 to 60 cm.

8. The method according to claim 7, wherein said glass substrate is subjected to a heating time of from about 2 to about 10 seconds.

9. The method of claim 1, wherein said superheating is effected in a zone which is about 1 m separated from a zone in which deposition occurs.

10. The method of claim 1, wherein the superheating is obtained by gas heating means.

11. The method according to claim 10, wherein the gas heating means uses acetylene, propane or butane.

12. The method of claim 1, wherein the superheating is obtained by heating elements combining heating by radiation and heating by convection.

13. The method of claim 1, wherein the method further comprises effecting an anti-color treatment.

14. The method of claim 13, wherein the anti-color treatment comprises forming at least one underlying film of SiO/Si produced by CVD inside a float glass production enclosure from a mixture of silane and unsaturated carbide gases.

15. The method according to claim 1, wherein said face of said substrate to be coated is superheated to have an increase in temperature of about 40° to 50° C., relative to the pyrolysis temperature of about 580° C., during said deposition.

* * * * *